United States Patent
Lee et al.

(10) Patent No.: US 9,175,224 B2
(45) Date of Patent: Nov. 3, 2015

(54) GASIFYING APPARATUS WITH VARIABLE GASIFIER AND USED AS BOTH POWER GENERATOR AND COMBUSTION BOILER, AND METHOD OF DRIVING THE SAME

(71) Applicant: KOREA INSTITUTE OF ENERGY RESEARCH, Daejeon (KR)

(72) Inventors: Jae Goo Lee, Daejeon (KR); Sang Jun Yoon, Daejeon (KR); Yong Ku Kim, Daejeon (KR); Jae Ho Kim, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 303 days.

(21) Appl. No.: 13/673,449

(22) Filed: Nov. 9, 2012

(65) Prior Publication Data
US 2013/0340339 A1 Dec. 26, 2013

(30) Foreign Application Priority Data
Jun. 26, 2012 (KR) .................. 10-2012-0068800

(51) Int. Cl.
| | | |
|---|---|---|
| *C10B 1/04* | (2006.01) | |
| *C10J 3/22* | (2006.01) | |
| *C10J 3/84* | (2006.01) | |
| *C10K 1/02* | (2006.01) | |
| *F02B 43/08* | (2006.01) | |
| *C10J 3/26* | (2006.01) | |
| *C10J 3/42* | (2006.01) | |

(52) U.S. Cl.
CPC ... *C10B 1/04* (2013.01); *C10J 3/22* (2013.01); *C10J 3/84* (2013.01); *C10K 1/02* (2013.01); *C10K 1/026* (2013.01); *F02B 43/08* (2013.01); *C10J 3/26* (2013.01); *C10J 3/42* (2013.01); *C10J 2200/152* (2013.01); *C10J 2200/156* (2013.01); *C10J 2300/092* (2013.01); *C10J 2300/093* (2013.01); *C10J 2300/0916* (2013.01); *C10J 2300/0946* (2013.01); *C10J 2300/0956* (2013.01); *C10J 2300/165* (2013.01); *C10J 2300/1606* (2013.01); *C10J 2300/1687* (2013.01)

(58) Field of Classification Search
CPC .................. C10J 2300/0916; C10J 2300/092; C10J 2300/093; C10J 2300/0946; C10J 2300/165; C10J 3/26; C10J 3/42; C10J 3/84; C10K 1/02; C10K 1/026; F02B 43/08
See application file for complete search history.

(56) References Cited

U.S. PATENT DOCUMENTS

| | | | | |
|---|---|---|---|---|
| 4,146,369 | A * | 3/1979 | Flesch et al. ..................... | 48/201 |
| 4,309,195 | A * | 1/1982 | Rotter ............................... | 48/76 |
| 4,498,909 | A * | 2/1985 | Milner et al. .................... | 48/209 |
| 2006/0133973 | A1* | 6/2006 | Saares ............................ | 422/239 |
| 2008/0134581 | A1* | 6/2008 | Van Dyk et al. ................ | 48/210 |
| 2008/0148634 | A1* | 6/2008 | Yu et al. ............................ | 48/77 |
| 2008/0210089 | A1* | 9/2008 | Tsangaris et al. ................ | 95/90 |
| 2010/0107493 | A1* | 5/2010 | Weaver ........................ | 48/86 R |

(Continued)

*Primary Examiner* — Imran Akram
(74) *Attorney, Agent, or Firm* — Rothwell, Figg, Ernst & Manbeck, P.C.

(57) ABSTRACT

A gasifying apparatus including a variable gasifier and used as both a power generator and a combustion boiler and a method of driving the same are disclosed. A combustion boiler and a generator engine, driven with synthesis gas, are associated with a single gasifier, and the gasifying apparatus produces synthesis gas proper to a technical field of the gasifier by selectively applying an upflow gasifier and a downflow gasifier according to the technical field of the gasifier.

4 Claims, 9 Drawing Sheets

(56) References Cited

U.S. PATENT DOCUMENTS

2012/0003594 A1\* 1/2012 Faussone .................... 431/12
2012/0036778 A1\* 2/2012 Stryzhak .................... 48/86 R
2013/0309161 A1\* 11/2013 Akay ........................... 423/358

\* cited by examiner

GASIFYING APPARATUS WITH VARIABLE GASIFIER AND USED AS BOTH POWER GENERATOR AND COMBUSTION BOILER, AND METHOD OF DRIVING THE SAME

CROSS REFERENCE TO RELATED APPLICATIONS

This application claims priority from Korean patent application no. 10-2012-0068800 filed Jun. 26, 2012, all of which is incorporated herein by reference in its entirety for all purposes.

BACKGROUND OF THE INVENTION

1. Field of the Invention

The present invention relates to a gasifying apparatus including a variable gasifier and used as both a power generator and a combustion boiler and a method of driving the same, and more particularly to a gasifying apparatus in which a combustion boiler and a generator engine, driven with synthesis gas, are associated with a single gasifier, and for producing synthesis gas proper to a technical field of the gasifier by selectively applying an upflow gasifier and a downflow gasifier according to the technical field of the gasifier.

2. Description of the Prior Art

Gasification is a technology that produces synthesis gas containing carbon monoxide (CO) and hydrogen ($H_2$) from carbon in fuel consisting of hydrocarbons through an endothermic reaction of carbon using partial oxidation heat, carbon dioxide ($CO_2$), and water ($H_2O$).

Various gasifying apparatuses, to which the gasification technology is applied, are developed to be suitable for various fuels, oxidants, and purposes thereof.

If air and water vapor are used as gasifying agents in a fixed bed gasifier employed in a small-sized system, low calorie gas of 1,000 $kcal/Nm^3$ to 2,000 $kcal/Nm^3$ may be produced.

In general, a downflow-type fixed bed gasifying apparatus is used to generate distributed power for the purpose of reducing produced tar.

However, since the downflow-type gasifying apparatus has slightly difficult starting-up conditions, the easily operable upflow-type gasifying apparatus is recommended for use when the product synthesis gas is burnt itself or with oil.

That is, the upflow-type gasifier has merits in higher thermal efficiency, easier control, and higher compatibility of fuel conversion than the downflow-type gasifier, but has also drawbacks such as high quantity of product tar, high costs for filtering the synthesis gas, and most of all, removal of the tar from the product synthesis gas.

Meanwhile, the downflow-type gasifier may produce synthesis gas containing less tar and grains, but can sustain a stable process only when moisture is 20% or less within in a fuel.

Most enterprises and facility farms have different seasons of demanding electric power and using heat. Thus, since gasifiers, which use electric power or heat respectively, must be used to generate electric power or to burn synthesis gas by using synthesis gases produced through the gasifiers, facility costs increase.

SUMMARY OF THE INVENTION

Accordingly, the present invention has been made to solve the above-mentioned problems occurring in the prior art, and an object of the present invention is to provide a gasifying apparatus with a variable gasifier using a power generator and combustion boiler and a method of driving the same such that a proper quality of synthesis gas, produced by selectively applying upflow gasifcation or downflow gasification with a single gasifier, is supplied to be suitable for the purpose.

In order to accomplish this object, there is provided a gasifying apparatus with a variable gasifier using a power generator and combustion boiler, including: a variable gasifier varied such that fuel such as coal, biomass, RDF, and RPF is fed to perform upflow gasification or downflow gasification; a filtration device filtering synthesis gas produced by the variable gasifier; a feed controller controlling feeding direction of the synthesis gas filtered by the filtration device; and a combustion boiler and a gas engine driven with the synthesis gas selectively fed by the feed controller.

The gasifier includes: an introduction chamber having a fuel feeder formed at a top through which fuel is introduced; a gasification chamber positioned under the introduction chamber and a rotary grate formed on the bottom thereof to accumulate the fuel such that gasification is performed and to discharge ash after combustion is completed through the lower side; an outer chamber enclosing the gasification chamber, separated from the introduction chamber by a partition, and having an ash discharging hole formed on the bottom; a first gasification agent injection hole inserted into the outer chamber to communicate with the gasification chamber and inject gasification agent during the downflow gasification; a second gasification agent injection hole communicating to the lower side of the outer chamber and injecting the gasification agent during the upflow gasification; and a passage opening/closing unit including three directional passages as discharging apertures through which the synthesis gas is discharged from a side of the partition to the introduction chamber, the outer chamber, and the outside, communicating to the outer chamber with the synthesis gas discharging hole during the downflow gasification and communicating to the introduction chamber with the synthesis gas discharging hole during the upflow gasification for the discharge of the synthesis gas.

In accordance with another aspect of the present invention, there is provided a method of driving the gasifying apparatus including the steps of: introducing fuel through a fuel feeder to be accumulated in a gasification chamber of a gasifier while blocking oxygen from being introduced; determining whether the synthesis gas, which is produced by gasifying the fed fuel, is used for power generation or for a combustion boiler; communicating a synthesis gas discharging hole of a passage opening/closing unit with the introduction chamber or the outer chamber according to the determination; performing upflow gasification or downflow gasification by feeding gasification agent through a first or a second gasification agent injection hole according to the determination; producing the synthesis gas by performing the upflow gasification or the downflow gasification according to the performance of the upflow gasification or the downflow gasification; filtering foreign matter contained in the product synthesis gas; and generating electric power by feeding the synthesis gas filtered in the filtration into the gas engine or recovering heat by feeding the filtered synthesis gas into the combustion boiler.

According to the gasifying apparatus with a variable gasifier using a power generator and combustion boiler and a method of driving the same in accordance with the present invention, the gasifying apparatus further includes a passage opening/closing unit provided in the front side of a synthesis gas discharging hole to selectively communicate an upper space and a lower space in the gasifier partitioned by the gasification chamber and to change an injection position of the gasification agent such that upflow gasification and downflow gasification can be selectively performed.

Especially, when the synthesis gas is used for generating electric power or the combustion boiler, gasification suitable for the purpose is performed such that the synthesis gas is produced and fed so that unnecessary filtration can be omitted and thermal efficiency can be improved. Therefore, easy control can be achieved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
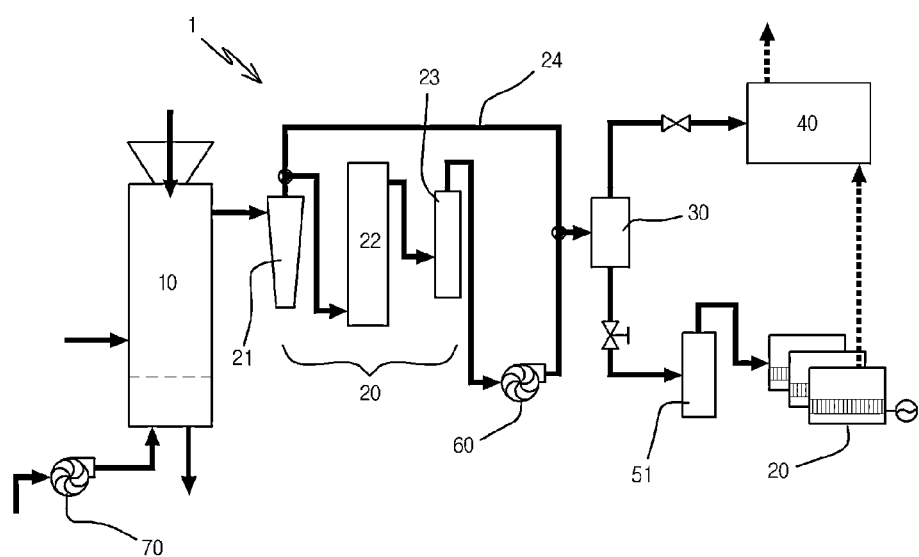
FIG. 1 is a schematic view illustrating a gasifying apparatus for generating electric power and providing heat using a variable gasifier according to an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

FIG. 1 is a schematic view illustrating a gasifying apparatus for generating electric power and providing heat using a variable gasifier according to an embodiment of the present invention.

As illustrated, a gasifying apparatus 1 according to an embodiment of the present invention includes a variable gasifier 10 varying such that fuel such as coal, biomass, RDF, and RPF is fed to perform upflow gasification or downflow gasification, a filtration device 20 filtering synthesis gas produced by the variable gasifier 10, a feed controller 30 controlling feeding direction of the synthesis gas filtered by the filtration device 20, and a combustion boiler 40 and a gas engine 50 driven with the synthesis gas selectively fed by the feed controller 30.

The gasifying apparatus 1 is configured to selectively enable upflow gasification and downflow gasification using a single gasifier such that synthesis gas is produced through downflow gasification, driving conditions of which are complicated when synthesis gas with low foreign matter content such as tar is used to drive a gas engine while such that the synthesis gas is produced through upflow gasification easily driven when the synthesis gas is fed to a combustion boiler burning the synthesis gas as a fuel regardless of the content of tar.

Figure 2:
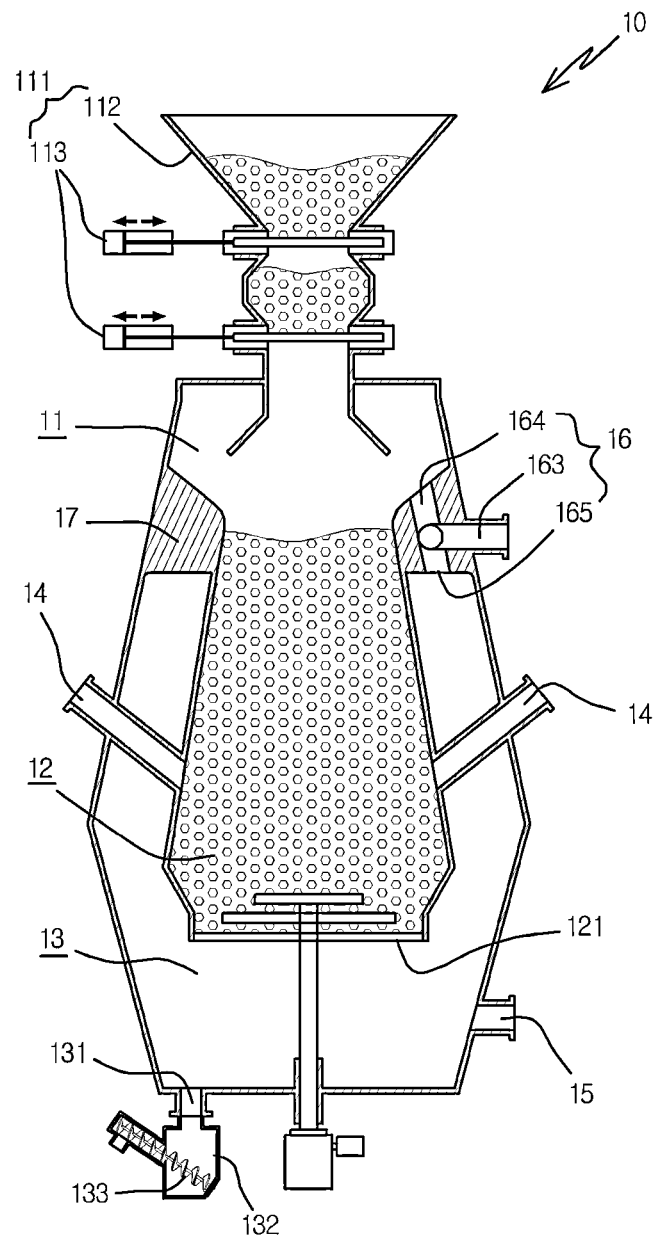
FIG. 2 is a schematic sectional view illustrating a gasifier according to an embodiment of the present invention.

FIG. 2 is a schematic sectional view illustrating a gasifier according to an embodiment of the present invention.

As illustrated, the gasifier 10 of the present invention is a vertical type in which an introduction chamber 11, a gasification chamber 12, and an outer chamber 13 are sequentially installed from top to bottom, wherein the outer chamber 13 encloses the gasification chamber 12 so that the outer chamber 13 communicates with the introduction chamber 11 via the gasification chamber 12.

The introduction chamber 11 is provided with a fuel feeder 111 on top. The fuel feeder 111 is configured such that two layer gate valves (slide gates) 113 are installed under a hopper 112 serving as a fuel supplying unit to be sequentially opened such that fuel only is introduced therein and air is prevented from being introduced therein.

The gasification chamber 12 has an upper side communicating with the introduction chamber 11 and a lower side communicating with the outer chamber 13 and includes a porous plate, that is, a grate 121 installed at the lower side to discharge ash which is already burnt or gasified. The grate 121 may be a circular plate in which a plurality of pins protrude from the upper side thereof or in which has multilayer thin circular plates, and includes a rotary shaft, rotated by a driving force, coupled to the lower side to scrape ash accumulated on the gasification chamber 12 during the rotation to be easily discharged.

Next, the outer chamber 13 encloses the gasification chamber 12 and has upper sides divided by the introduction chamber 11 and a partition 17. The outer chamber 13 is provided with an ash discharging hole 131 formed at the lower side to collect and discharge the ash discharged from the gasification chamber 12. In this case, the ash discharging hole 131 includes a collector 132 and a screw conveyor 133 such that the ash discharged from the ash discharging hole 131 can be continuously discharged out of the gasifying apparatus 1, wherein the screw conveyor 133 has an upward slope from the collector 132 such that the ash and a screw block a passage to prevent gas from being discharged through the ash discharging hole 131 from the outer chamber 13.

As described above, the gasifier 10 including the introduction chamber 11, the gasification chamber 12, and the outer chamber 13 further includes a first gasification agent injection hole 14 and a second gasification agent injection hole 15 to feed a gasification agent consisting of air or a mixture of air and water vapor. The first gasification agent injection hole 14 communicates with the gasification chamber 12 by penetrating the outer chamber 13 such that the gasification agent is injected during the downflow gasification, while the second gasification agent injection hole 15 communicates with the lower side of the outer chamber 13 such that the gasification agent is injected during the upflow gasification.

Valves are mounted on lines of the first and second gasification agent injection holes 14 and 15 such that the gasification agent may be selectively injected. For the upflow gasification in the gasification chamber 12, the gasification agent may be fed through the second gasification agent injection hole 15 and a forced draft fan (FD fan) 70 may be installed at a front line of the second gasification agent injection hole 15 such that forced blowing toward the gasification chamber 12 can be carried out. For the downflow gasification, an induced draft fan (ID fan) 60 is installed at a rear line connected to a later-described synthesis gas discharging hole 163 such that blowing is carried out by suctioning by the gasifier 10, resulting in a fluid stream throughout the gasifying apparatus 1.

A passage opening/closing unit 16 is installed at a side of the partition 17 partitioning the upper side of the outer chamber 13 enclosing the gasification chamber 12 and the lower side of the introduction chamber 11. The passage opening/closing unit 16 has three directional passages such as a synthesis gas discharging hole 163 communicated with the outside of the gasifier 10, a passage 164 communicated with the introduction chamber 11, and a passage 165 communicated with the outer chamber 13 and closes any one of the two passages 164 and 165 that are communicated with the introduction chamber 11 and the outer chamber 13 such that only one of the two passages 164 and 165 communicated with the introduction chamber 11 and the outer chamber 13 the synthesis gas communicates with the synthesis gas discharging hole 163 to discharge the synthesis gas.

Figure 3A:
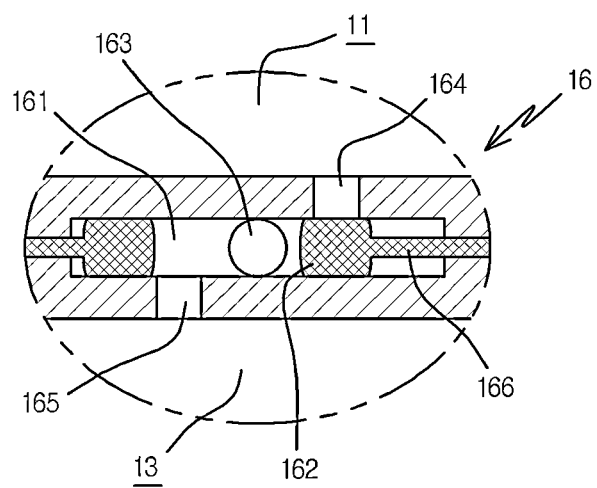
FIGS. 3A, 3B, and 3C are schematic sectional views illustrating a passage opening/closing unit according to an embodiment of the present invention.
Figure 3B:
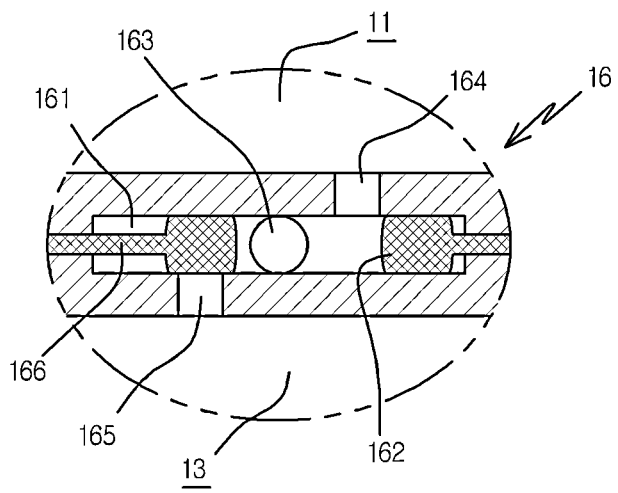

As illustrated in FIGS. 3A and 3B, the passage opening/closing unit 16 may include an opening/closing chamber 161 elongated horizontally and an opening/closing piston 162 inserted into the opening/closing chamber 161.

The opening/closing chamber 161 may be elongated in the longitudinal direction including the vertical direction in addition to the horizontal direction as depicted in the drawings, wherein the synthesis gas discharging hole 163 communicates with the center of the opening/closing chamber 161 and the upper passage 164 communicated with the upper introduction chamber 11 and the lower passage 165 communicated with the outer chamber 13 are formed at both lateral sides.

The opening/closing piston 162 come in close contact with the inner surface of the opening/closing chamber 161 for creating an air-tight seal and is pushed and pulled by a piston rod 166 to open and close the passages communicated with the introduction chamber 11 and the outer chamber 13.

Figure 3C:
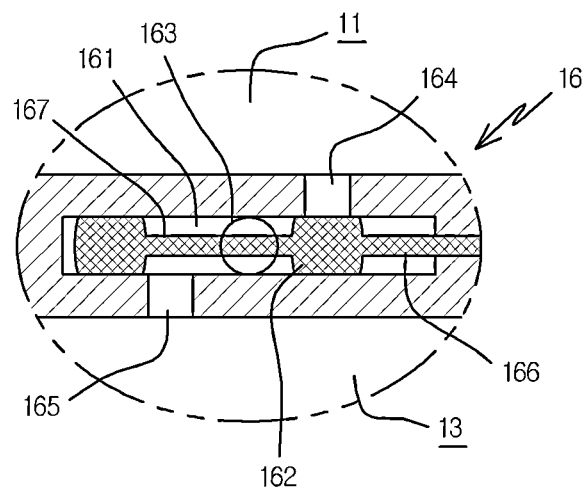

A plurality of opening/closing pistons 162 is provided to open and close the passages 164 and 165 communicated with the introduction chamber 11 and the outer chamber 13, respectively, and includes respective piston rods 166 extending out, as illustrated in FIGS. 3A and 3B, to work individually or includes a connector bar 167 connecting the two opening/closing pistons 162 to each other as shown in FIG. 3C to integrate the two opening/closing pistons 162 and the connecting rod 166 extending from any side thereof such that the opening/closing pistons 162 may move. When the two opening/closing pistons 162 are integrated with each other, the three passages of the opening/closing chamber 161 are arranged in the same interval such that the length of the connector bar may correspond to the interval between the passages of the opening/closing chamber 161 so that one passage is opened when another passage is closed.

The first gasification agent injection hole 14 may be configured to control the feed of the gasification agent.

Figure 4:
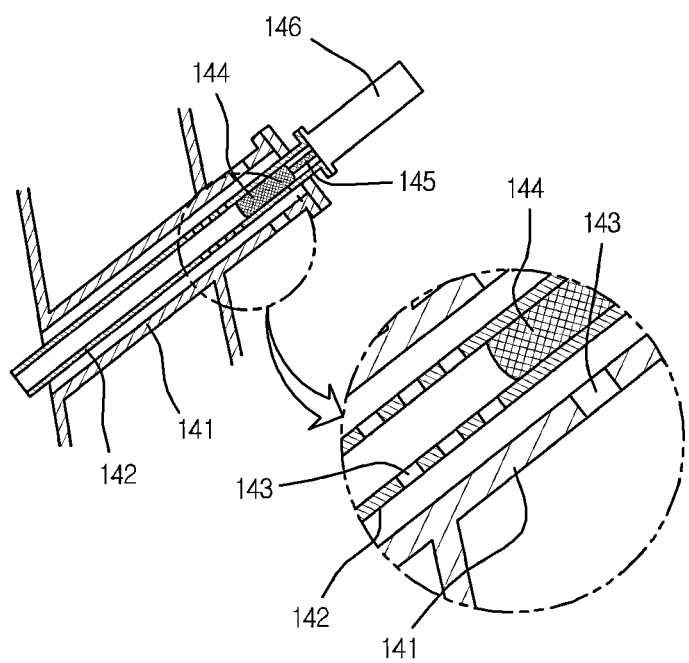
FIGS. 4 and 5 are schematic sectional views illustrating a gasifying agent inflow adjustor of a first gasifying agent injection hole according to an embodiment of the present invention.

Referring to FIG. 4, the first gasification agent injection hole 14 according to the present invention includes an outer tube 141 with a flange formed at an outwardly protruding end, an inner tube 142 inserted in the outer tube 141, a seal 144 sliding within the inner tube 142 to open and close gasification agent introduction holes formed in the inner tube 142, and a cylinder 146 moving the seal 144 and controls the feed of the gasification agent introducing into the gasifier.

The outer tube 141 has an outwardly protruding closed end, a closed end connected to the gasification chamber 12, and a plurality of axial or ring-shaped gasification agent introduction holes 143 formed on the outer surface.

The inner tube 142 is inserted into the outer tube 141, has an end located within the gasification chamber 12, the outwardly protruding end, and a plurality of axial or ring-shaped gasification agent introduction holes 143 formed on the outer surface.

Thus, the gasification agent, that is, air is introduced into the outer tube 141 via the gasification agent introduction holes 143 of the outer tube 141, is further introduced into the inner tube 142 through the gasification agent introduction holes 143 of the inner tube 142, and is finally fed into the gasification chamber 12.

The seal 144 installed in the inner tube 142 is moved in the axial direction to control the feed of the gasification agent to be introduced. For example, the seal 144 has a length in the inner tube 142 to close all the gasification agent introduction holes 143 elongating in the axial direction and moves forward or backward from the cylinder 146 by a seal rod coupled to the rear side of the seal 144 to sequentially open and close the gasification agent introduction holes 143 such that the feed of the introduced gasification agent can be controlled according to the degree of opening the gasification agent introduction holes 143.

Figure 5:
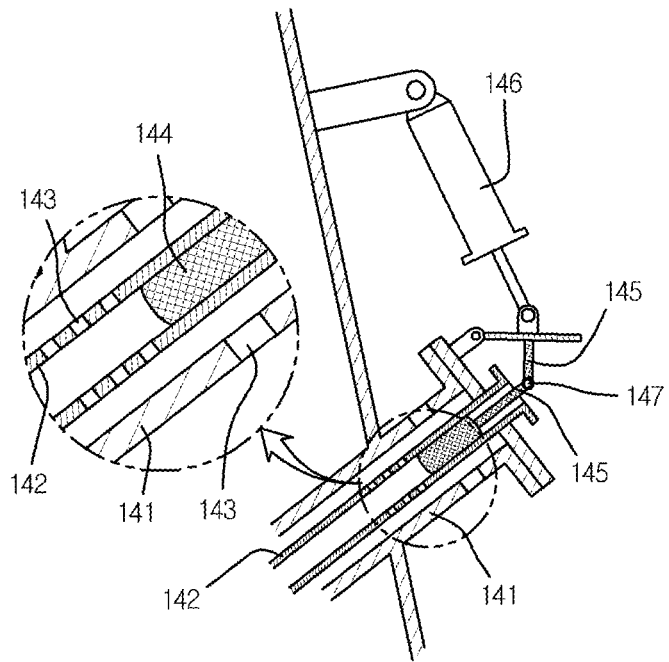

In this configuration, the cylinder 146, as shown in FIG. 4, may be installed in the same axial direction as that of the first gasification agent injection hole 14 or in the different axial direction from that of the first gasification agent injection hole 14 as shown in FIG. 5, and the seal rods 145 are connected to the cylinder 146 with a joint 147 so that width of the apparatus can be minimized.

Meanwhile, the synthesis gas produced in the gasifier 10 is filtered by the filtration device 20. As illustrated in FIG. 1, the filtration device 20 includes a cyclone 21 separating solid particles from the synthesis gas discharged from the gasifier, a scrubber 22 spraying washing water to the synthesis gas discharged from the cyclone 21 to remove foreign matter from the synthesis gas, a filter 23 filtering fine particles contained in the synthesis gas passing through the scrubber 22, and a bypass 24 bypassing the synthesis gas passing through the cyclone 21 directly to the feed controller 30 during the upflow gasification reaction.

The cyclone 21 is a device that separates large-sized solid particles and is basically used to filter the synthesis gas produced during the upflow or downflow gasification.

The synthesis gas passing through the cyclone 21 is directly fed into the feed controller 30 via the bypass 24 or to the scrubber 22. That is, the synthesis gas produced during the upflow gasification is fed into the feed controller 30 through the bypass 24 to be used only for the combustion boiler 40, while the synthesis gas produced during the downflow gasification passes through the scrubber 22 and the filter 23 and is finally fed into the gas engine 50 through the feed controller 30 such that electric power is generated. In this case, feed of the synthesis gas discharged from the cyclone 21 to the bypass 24 and the scrubber 22 may be controlled by a distribution valve installed on a transfer pipe, and the passage line passing through the distributed bypass or the scrubber may be directly communicated with the feed controller 30 or combined into one by a combination valve before the communication with the feed controller.

Moreover, the synthesis gas fed into the gas engine 50 by the feed controller 30 may be temporally reserved in a tank 51 and surplus synthesis gas is fed into the combustion boiler 40 to generate heat with water steam when the reservation of the synthesis gas exceeds a limit. In addition, the combustion boiler 40, as described above, includes oil substitute in a wide sense in addition to a boiler.

Coolant of the gas engine 50 is utilized as reactive water of the combustion boiler 40 so that an arrangement of the gas engine can be utilized.

Figure 6:
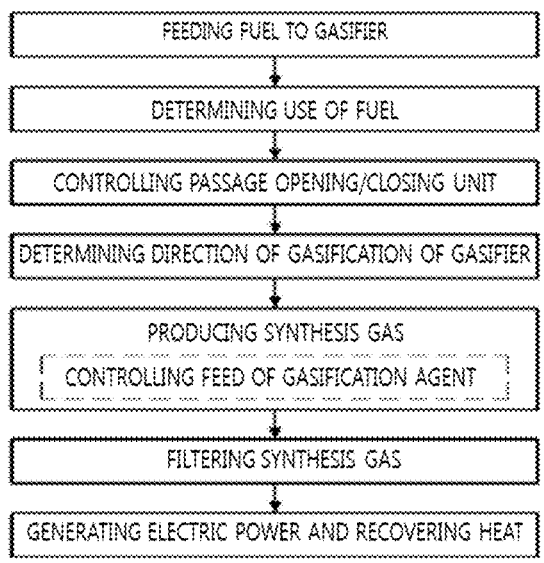
FIG. 6 is a block diagram illustrating a method of driving a gasifying apparatus according to an embodiment of the present invention.

As illustrated in FIG. 6, the method of driving a gasifying apparatus according to an embodiment of the present invention includes the steps of: introducing fuel through a fuel feeder to be accumulated in a gasification chamber of a gasifier while blocking oxygen from being introduced; determining whether synthesis gas, which is produced by gasifying the fed fuel, is used for power generation or for a combustion boiler; communicating a synthesis gas discharging hole of a passage opening/closing unit with an introduction chamber or an outer chamber according to the determination; performing upflow gasification or downflow gasification by feeding a gasification agent through a first or a second gasification agent injection hole according to the determination; producing the synthesis gas by performing the upflow gasification or the downflow gasification according to the performance of the upflow gasification or the downflow gasification; filtering foreign matter contained in the product synthesis gas; and generating electric power by feeding the synthesis gas filtered in the filtration into the gas engine or recovering heat by feeding the filtered synthesis gas into the combustion boiler.

Moreover, in the synthesis gas production, the method may further include the sub-step of moving the seal into the inner tube to adjust the number of first gasification agent injection apertures such that the feed of the gasification agent is controlled in the first gasification agent injection hole 14 having the inner tube and the outer tube, which are formed with a plurality of first gasification agent injection apertures on the outer surface, when the downflow gasification is performed.

Moreover, in the filtration, the synthesis gas produced during the downflow gasification passes through the cyclone, the scrubber, and the filter and is fed into the feed controller so that the synthesis gas may be used in power generation, while the synthesis gas produced during the upflow gasification passes through only the cyclone and is fed into the feed controller so that the synthesis gas may be used in heat recovery by the combustion boiler.

Figure 7:
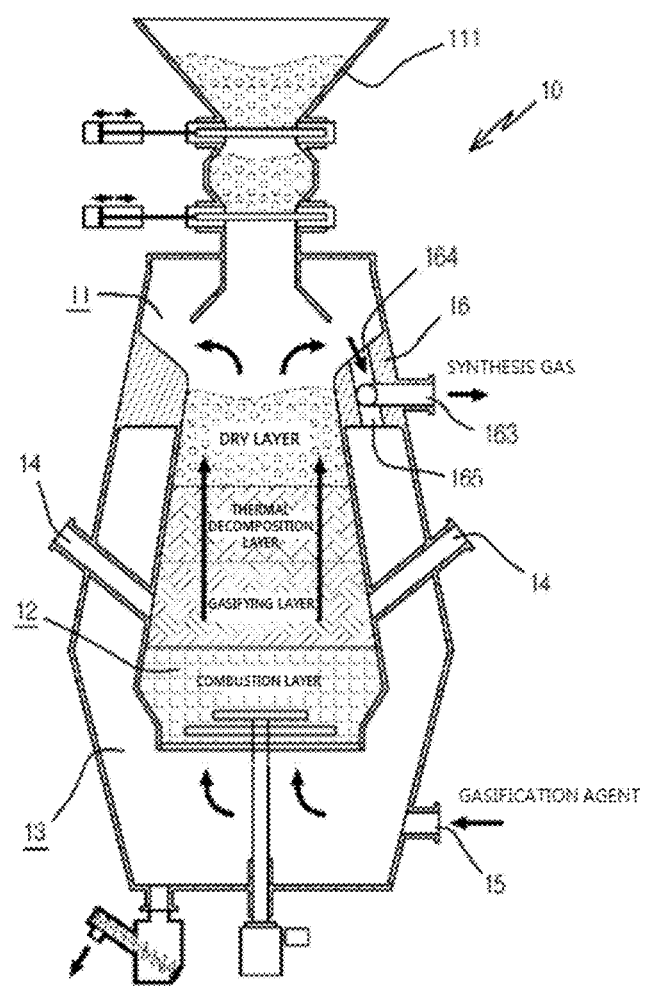
FIGS. 7 and 8 are schematic views illustrating driving in which upflow gasification and downflow gasification are carried out in the gasifier according to the embodiment of the present invention.

Operations during the upflow gasification will be described with reference to FIGS. 1 and 7.

First, fuel is fed through the fuel feeder 111 such that the fuel is accumulated in the gasification chamber 12 of the gasifier 10, the gasification agent is forcibly injected into the second gasification agent injection hole 15 through the FD fan 70, and at the same time, the passage opening/closing unit 16, as shown in FIG. 3B, blocks the passage 165 communicated with the outer chamber 13 and opens the passage 164 communicated with the introduction chamber 11 such that the synthesis gas discharging hole 163 communicates with the introduction chamber 11.

When the passages are formed as described above, the gasification agent injected through the second gasification agent injection hole 15 is fed toward the introduction chamber 11 through the lower side of the gasification chamber 12 so that air stream becomes an upflow. The accumulated fuel in the gasification chamber 12 has a combustion layer, a gasification layer, a thermal decomposition layer, and a dry layer from the lowest layer to the uppermost layer such that heat transfer may be performed. In this case, the combustion gas in the combustion layer moves upward and carbon in the fuel reacts with carbon dioxide ($CO_2$) and water vapor to produce synthesis gas, and the product synthesis gas is discharged out of the synthesis gas discharging hole 163 through the passage opening/closing unit 16.

The synthesis gas discharged from the synthesis gas discharging hole 163 is fed into the feed controller 30 through the bypass 24 after large-sized grains contained in the synthesis gas are separated while passing through the cyclone 21, and the feed controller feeds the synthesis gas to the combustion boiler 40 to generate heat.

Figure 8:
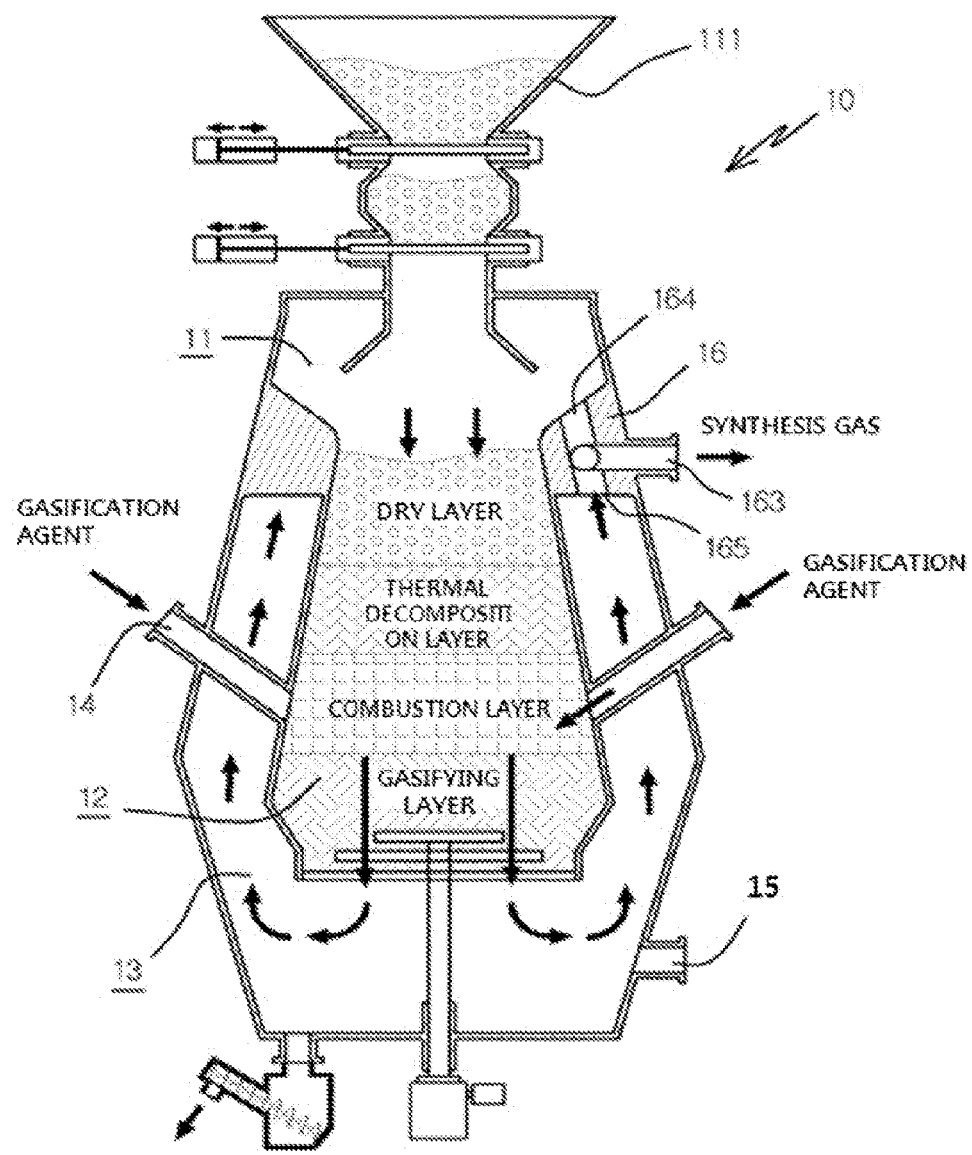

Operations during the downflow gasification will be described with reference to FIGS. 1 and 8.

First, the fuel is fed by the fuel feeder 111 to be accumulated in the gasification chamber 12 of the gasifier 10, and the passage opening/closing unit 16, as illustrated in FIG. 3A, opens the passage 165 communicated with the outer chamber 13 and blocks the passage 164 communicated with the introduction chamber 11 such that the synthesis gas discharging hole 163 communicates with the outer chamber 13 and closes the second gasification agent injection hole 15.

When the ID fan 60 installed at the rear end of the filtration device 20 is driven, air stream becomes a downflow such that the gasification agent (air) is introduced from the first gasification agent injection hole 14 by the suctioning force of the ID fan 60, is fed to the middle portion of the gasification chamber 12, and moves to the outer chamber 13 through the lower side of the gasification chamber 12, while the seal 144 in the first gasification agent injection hole 14 moves to adjust the number of opened gasification agent introduction holes 143 such that the quantity of the gasification agent fed in the form of introducing downflow can be controlled.

Moreover, the fuel accumulated in the gasification chamber 12, to the middle portion of which the gasification agent is introduced, forms the combustion layer, the lower side of the combustion layer to which maximum combustion heat is supplied forms the gasification layer, the upper side of the combustion layer to which heat of the combustion layer is transferred forms the thermal decomposition layer, and the upper side of the thermal decomposition layer forms the dry layer. The synthesis gas discharged through the lower end of the gasification chamber moves upward along the inner wall of the outer chamber 13 and is discharged out through the synthesis gas discharging hole of the passage opening/closing unit 16.

The synthesis gas discharged through the synthesis gas discharging hole 163 passes through the cyclone 21 while separating large-sized grains contained therein, passes through the scrubber 22 and the filter 23 sequentially such that foreign matter is removed as much as possible, and is fed into the feed controller 30.

The feed controller 30 feeds the synthesis gas into the gas engine 50 such that power generation is performed. In this case, the tank 51 is installed between the feed controller 30 and the gas engine 50 such that the synthesis gas can be steadily fed to the gas engine 50. Further, when the synthesis gas produced for the gas engine is excessively produced, the surplus thereof may be fed to the combustion boiler 40 to generate heat.

Hereinafter, the present invention will be described through preferred embodiments in detail.

Embodiment

As illustrated in FIG. 1, in the gasifying apparatus according to the embodiment of the present invention, the position and direction of injecting air are controlled to restrict the generation of tar and flow of the synthesis gas is changed by the opening/closing piston in the passage opening/closing unit 16 of the gasifier, as shown in FIGS. 3A and 3B, for the purpose of generating heat and electric power.

Figure 9:
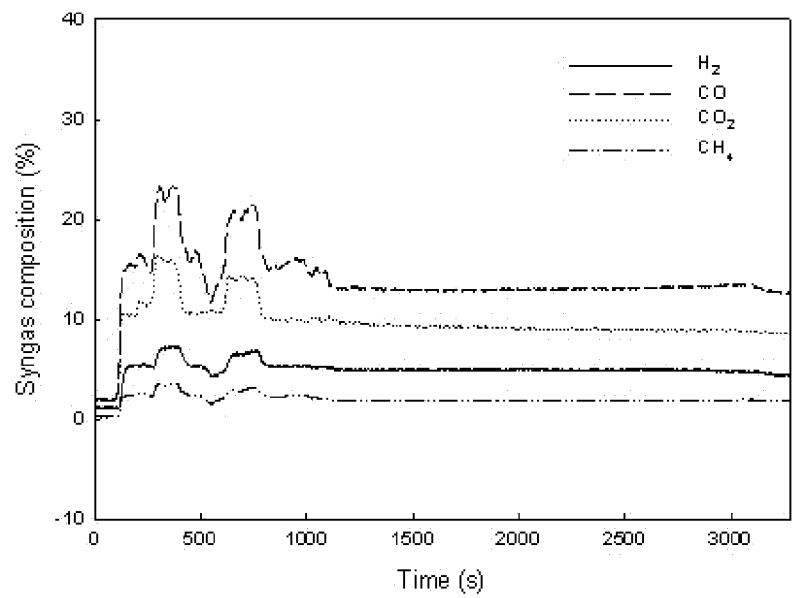
FIGS. 9 and 10 are graphs illustrating components of synthesis gas produced during the upflow driving and the downflow driving of the gasifier according to the embodiment of the present invention.
Figure 10:
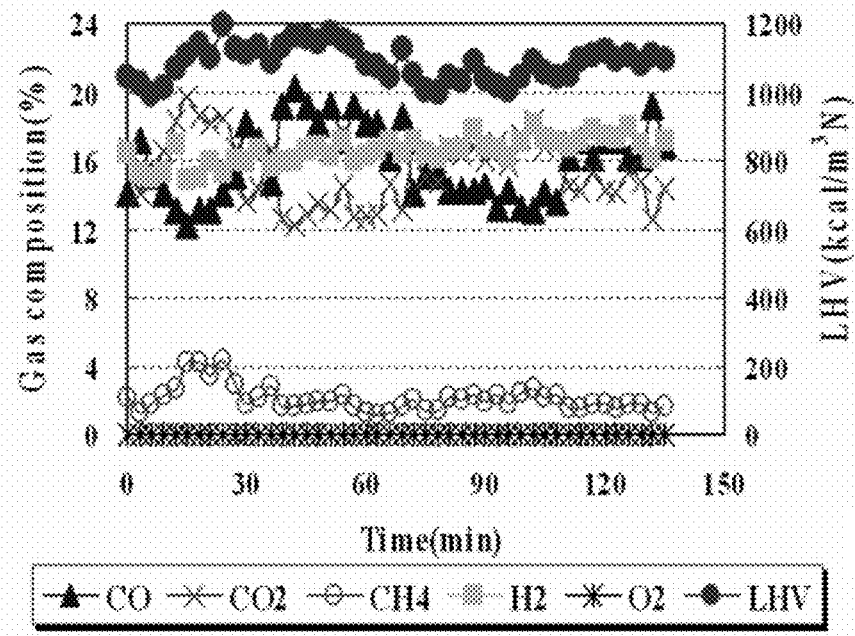

Fuel fed to the gasifier has compositions and calories as listed in Table 1, operating conditions of the gasifier are listed in Table 2, compositions and calories of the synthesis gas produced by injection the fuel and by operating the gasifier are listed in Table 3, and graphs exhibiting operation results of the upflow gasifier and the downflow gasifier are illustrated in FIGS. 9 and 10.

TABLE 1

| Sample | Proximate analysis (wt %) | | | | HHV (kcal/kg) |
|---|---|---|---|---|---|
| | Moisture (M) | Voltaile matter (V.M) | Ash | Fixed carbon (F.C) | |
| Chinese coal | 0.81 | 7.18 | 12.44 | 79.57 | 7,280 |
| Wood chips | 21.6 | 60.14 | 3.85 | 14.34 | 4,130 |

TABLE 2

| Fuel | Feed of fuel (kg/h) | Feed of air (Nm$^3$/h) | Max. temp. of gasifier (° C.) |
|---|---|---|---|
| Chinese coal | 10-15 | 20-30 | 1,000-1,200 |
| Wood chips (upflow) | 40-50 | 50-60 | 700-800 |
| Wood chips (downflow) | 60-70 | 75-85 | 800-900 |

TABLE 3

| Sample | H$_2$ (%) | CO (%) | CO$_2$ (%) | CH$_4$ (%) | HHV (kcal/Nm$^3$) |
|---|---|---|---|---|---|
| Chinese coal (upflow) | 17.4 | 20.7 | 11.9 | 1.6 | 1,240 |
| Wood chips (upflow) | 7.8 | 25.0 | 8.9 | 3.0 | 1,213 |
| Wood chips (downflow) | 14.5 | 17.3 | 16.0 | 2.2 | 1,117 |

As listed in Table 3, production of hydrogen and carbon dioxide in the downflow gasifier is higher than that in the upflow gasifier and the higher heating value (HHV) in the upflow gasifier is higher than that in the downflow gasifier.

Moreover, the quantity of tar produced by variable operation of the gasifiers is compared and analyzed.

Figure 11:
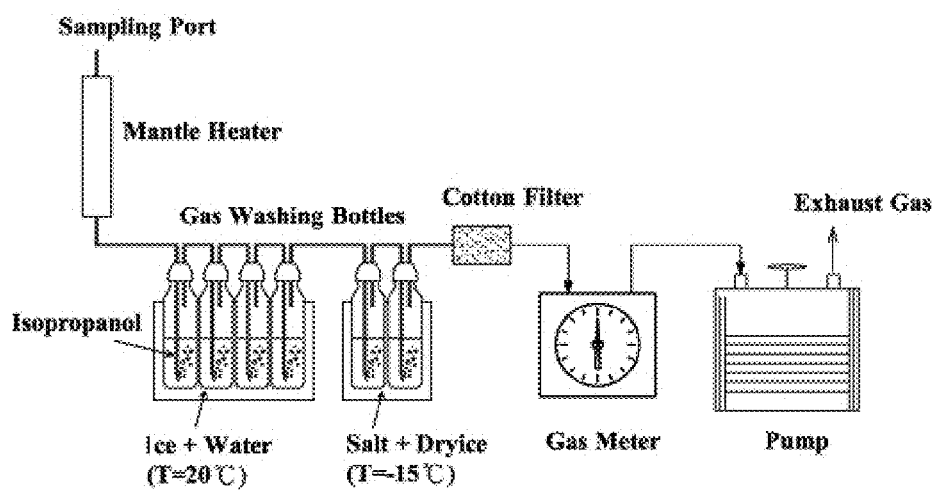
FIG. 11 is a schematic view illustrating a measuring device collecting tar contained in the synthesis gas produced in the gasifier according to the embodiment of the present invention.

Tar is collected from sampling ports installed to the synthesis gas discharging holes of the gasifiers by a method as illustrated in FIG. 11, based on Guideline for Sampling and Analysis of Tar and Particles in Biomass Producer Gases Version 3.3 proposed J. P. A. Neeft.

Tar solution in an impinger is filtered with a paper filter and tar attached on the inner wall of the impinger is resolved with isopropanol collected solution distilled by a distiller.

When matter remaining after the distillation is defined as tar and a concentration of the tar is obtained from a sampling gas flowrate, the quantity of tar produced by the gasifying apparatus according to the present invention ranges 100 to 150 g/Nm$^3$ of fuel fed in the upflow gasifier, while the quantity of tar produced by the downflow gasifier ranges 3.9 to 4.4 g/Nm$^3$. The synthesis gas produced by the downflow gasifier could be used in the gas engine by reforming a catalyst or by performing wet filtration.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A gasifying apparatus comprising:
   a variable gasifier varied such that fuel selected from the group consisting of coal, biomass, RDF, and RPF is fed to perform upflow gasification or downflow gasification;
   a filtration device configured to filter synthesis gas produced by the variable gasifier;
   a feed controller programmed to control a feeding direction of the synthesis gas filtered by the filtration device; and
   a combustion boiler and a gas engine configured to be driven with the synthesis gas selectively fed by the feed controller,
   wherein the gasifier comprises:
   an introduction chamber having a fuel feeder formed at a top through which fuel is introduced;
   a gasification chamber positioned under the introduction chamber and a rotary grate formed on the bottom thereof to accumulate the fuel such that gasification is performed and to discharge ash after combustion is completed through the lower side;
   an outer chamber enclosing the gasification chamber, separated from the introduction chamber by a partition, and having an ash discharging hole formed on the bottom;
   a first gasification agent injection hole inserted into the outer chamber to communicate with the gasification chamber and inject the gasification agent during the downflow gasification;
   a second gasification agent injection hole communicating the lower side of the outer chamber and injecting the gasification agent during the upflow gasification; and
   a passage opening/closing unit including three directional passages as discharging apertures through which the synthesis gas is discharged from a side of the partition to the introduction chamber, the outer chamber, and the outside, communicating the outer chamber with the synthesis gas discharging hole during the downflow gasification and communicating the introduction chamber with the synthesis gas discharging hole during the upflow gasification for the discharge of the synthesis gas.

2. The gasifying apparatus as claimed in claim 1, wherein the filtration device comprises:
   a cyclone configured to separate solid particles from the synthesis gas discharged from the gasifier;
   a scrubber configured to spray washing water into the synthesis gas discharged from the cyclone to remove foreign matter;
   a filter configured to filter fine particles contained in the synthesis gas passing through the scrubber; and
   a bypass configured to bypass the synthesis gas passing through the cyclone gas to the feed controller.

3. The gasifying apparatus as claimed in claim 1, wherein the passage opening/closing unit comprises:
   an opening/closing chamber elongated in the longitudinal direction, including a middle portion with which the synthesis gas discharging hole communicates, a passage formed on the upper side to communicate with the introduction chamber and a passage formed on the lower side to communicate with the outer chamber; and
   an opening/closing piston inserted into the opening/closing chamber to be moved by a piston rod to close any one of the passages that communicate with the outer chamber and the introduction chamber.

4. The gasifying apparatus as claimed in claim 1, wherein the first gasification agent injection hole comprises:
- an outer tube in which an outwardly protruding portion and both lateral sides facing the gasification chamber are closed and in which a plurality of gasification agent introduction holes are formed on the outer surface;
- an inner tube inserted in the outer tube such that an end is positioned in the gasification chamber and the other end protrudes outward, and having a plurality of gasification agent introduction holes formed on the outer surface in the axial direction;
- a seal sliding within the inner tube to open and close the gasification agent introduction holes; and
- a cylinder including a seal rod coupled with the rear side thereof to move the seal forward and backward in the axial direction of the inner tube.

* * * * *